(12) United States Patent
Shimozaki

(10) Patent No.: US 8,857,881 B2
(45) Date of Patent: Oct. 14, 2014

(54) DRAWER DEVICE

(75) Inventor: Kei Shimozaki, Yokohama (JP)

(73) Assignee: NIFCO Inc., Yokohama-Shi (JP)

( * ) Notice: Subject to any disclaimer, the term of this patent is extended or adjusted under 35 U.S.C. 154(b) by 308 days.

(21) Appl. No.: 13/138,874

(22) PCT Filed: Mar. 23, 2010

(86) PCT No.: PCT/JP2010/002028
§ 371 (c)(1),
(2), (4) Date: Dec. 20, 2011

(87) PCT Pub. No.: WO2010/119621
PCT Pub. Date: Oct. 21, 2010

(65) Prior Publication Data
US 2012/0119534 A1 May 17, 2012

(30) Foreign Application Priority Data

Apr. 14, 2009 (JP) ................. 2009-098355

(51) Int. Cl.
*B60R 7/06* (2006.01)
(52) U.S. Cl.
USPC ........ 296/37.12; 224/281; 224/483; 224/926; 248/311.2
(58) Field of Classification Search
USPC ............... 248/311.2; 224/281, 926, 483; 296/37.12
See application file for complete search history.

(56) References Cited

U.S. PATENT DOCUMENTS

| | | | | |
|---|---|---|---|---|
| 5,297,767 | A | * | 3/1994 | Miller et al. .............. 248/311.2 |
| 6,854,779 | B2 | * | 2/2005 | Gehring et al. ........... 296/37.12 |
| 7,568,601 | B2 | * | 8/2009 | Kogami et al. .............. 224/483 |

FOREIGN PATENT DOCUMENTS

| | | |
|---|---|---|
| JP | U H03-91244 | 9/1991 |
| JP | U H03-96931 | 10/1991 |
| JP | U H03-118132 | 12/1991 |
| JP | U H04-16039 | 2/1992 |
| JP | H04-154441 | 5/1992 |
| JP | 2004-359083 A | 12/2004 |

OTHER PUBLICATIONS

European Patent Office, "Supplementary European Search Report for EP 10 764 208.4-1758", May 7, 2013.

* cited by examiner

*Primary Examiner* — Amy J. Sterling
(74) *Attorney, Agent, or Firm* — Manabu Kanesaka

(57) ABSTRACT

To easily handle a drawer device for a combined use as a container box and a cup holder to selectively use as the container box or the cup holder without requiring a troublesome operation. A connecting mechanism (80) is provided, which connects both a cup holder plate (50) and a tray (20) in a case wherein both are housed inside a housing (12) from a state wherein both are drawn to the maximum drawn position, and separates a connection between the cup holder plate (50) and the tray (20) in a case wherein the tray (20) is housed inside the housing (12) from a state wherein only the tray (20) is drawn to the maximum drawn position.

5 Claims, 7 Drawing Sheets

DRAWER DEVICE

RELATED APPLICATIONS

The present application is National Phase of International Application No. PCT/JP2010/002028 filed Mar. 23, 2010, and claims priority from Japanese Application No. 2009-098355 filed Apr. 14, 2009

FIELD OF TECHNOLOGY

The invention relates to a drawer device provided in an interior of a vehicle such as an automobile and the like, and especially, relates to a drawer device selectively used as a container box and a cup holder.

BACKGROUND ART

As a drawer device provided in the interior of the vehicle such as the automobile and the like, a drawer device, including a box-shaped housing with a front face opening; a tray with an upside opening provided in the housing so as to be capable of being taken in and out; and a cup holder plate disposed on an upside of the tray, and provided in the housing so as to be capable of being taken in and out separately from the tray, is well-known (for example, Patent Document 1). In a case wherein only the tray is drawn forward from the front face opening of the housing, the drawer device is used as the container box, and in a case wherein the tray and the cup holder plate are drawn forward from the front face opening of the housing, the drawer device is used as the cup holder.

PRIOR ART DOCUMENT

Patent Document

Patent Document 1: Japanese Patent Application Publication (A) No. H04 (1992)-154441

SUMMARY OF THE INVENTION

Problems to be Solved by the Invention

The above-mentioned drawer device is selectively used as the container box and the cup holder. However, in the drawer device, in a case wherein a state of the cup holder in which both the tray and the cup holder plate are drawn is returned to a housed state, both the tray and the cup holder plate may be pushed into the housing together. However, in a case wherein the drawer device is used as the cup holder again, in each time the tray is drawn from the housing, an operation drawing the cup holder plate from the housing by hand is required separately from a drawing operation of the tray. Consequently, an operation of a conventional drawer device was troublesome in usage as the cup holder.

Also, in the drawer device, in order to integrate the tray and the cup holder plate, an operation such that a locking claw provided in the cup holder plate is locked in a locking border of the tray and the like was required.

Problems to be solved by the present invention are to provide a drawer device which can be used selectively as the container box or the cup holder without requiring a troublesome operation, and improve usability of the drawer device for a combined use as the container box and the cup holder.

Device for Solving the Problems

A drawer device according to the present invention includes a box-shaped housing with a front face opening; a tray with an upside opening provided in the housing so as to be capable of being taken in and out; a cup holder plate disposed on an upside of the tray, and provided in the housing so as to be capable of being taken in and out separately from the tray; and a connecting mechanism connecting both the cup holder plate and the tray in a case wherein both the cup holder plate and the tray are housed inside the housing from a state wherein both the cup holder plate and the tray are drawn to the maximum drawn position, and separating the connection between the cup holder plate and the tray in a case wherein the tray is housed inside the housing from a state wherein only the tray is drawn to the maximum drawn position. Incidentally, the term maximum drawn position here may be a position including a position near the maximum drawn position.

Preferably, in the drawer device according to the present invention, the tray includes a first abutting portion abutting against the cup holder plate in a movement of a direction housed inside the housing, and pushing the cup holder plate into a direction housed inside the housing. The connecting mechanism includes an engaging member provided in the tray, positioned in an evacuated position allowing a free movement in a taken-in-and-out direction of the cup holder plate relative to the tray by positioning the tray in the maximum drawn position (including the position near the maximum drawn position), and moving to an engaging movement position by positioning the tray in a position other than the maximum drawn position (including the position near the maximum drawn position). In a case wherein both the cup holder plate and the tray are housed inside the housing from the state wherein both the cup holder plate and the tray are drawn to the maximum drawn position (including the position near the maximum drawn position), in the engaging movement position (including the position near the maximum drawn position), the engaging member connects the cup holder plate and the tray in a movement of a direction drawn from the housing. In a case wherein the tray is housed inside the housing in the state wherein the cup holder plate is not positioned in the maximum drawn position (including the position near the maximum drawn position), in the engaging movement position, the engaging member does not connect the cup holder plate and the tray in the movement of the direction drawn from the housing.

Preferably, in the drawer device according to the present invention, the engaging member includes a cam follower portion engaging a cam-shaped portion formed in the housing by a cam, and under the cam engagement, the tray moves between the evacuated position and the engaging movement position due to a taken-in-and-out movement relative to the housing.

Preferably, in the drawer device according to the present invention, the tray includes a second abutting portion abutting against the cup holder plate when the tray moves from the position near the maximum drawn position (including the position near the maximum drawn position) to the maximum drawn position (including the position near the maximum drawn position) in the movement drawn from the housing, and moving the cup holder plate in the direction drawing from the housing.

Effect of the Invention

According to the drawer device of the present invention, in a case wherein-both the cup holder plate and the tray are housed inside the housing from a usage state as the cup holder wherein both the cup holder plate and the tray are drawn to the maximum drawn position (including the position near the maximum drawn position), both the cup holder plate and the tray are connected by the connecting mechanism, so that when the tray is drawn after that, the cup holder plate is also drawn together with the tray, and a state of the cup holder before the cup holder is stored, is replicated.

On the other hand, in a case wherein the tray is housed inside the housing from a usage state as the container box wherein only the tray is drawn to the maximum drawn position (including the position near the maximum drawn position), the connection between the cup holder plate and the tray due to the connecting mechanism is separated, so that when the tray is drawn after that, only the tray is drawn, and a state of the container box before the container box is stored, is replicated.

As a result, without requiring a troublesome operation, the present invention can be used selectively as the container box or the cup holder, and improves usability of the drawer device for a combined use as the container box and the cup holder.

BEST MODES OF CARRYING OUT THE INVENTION

Figure 1:
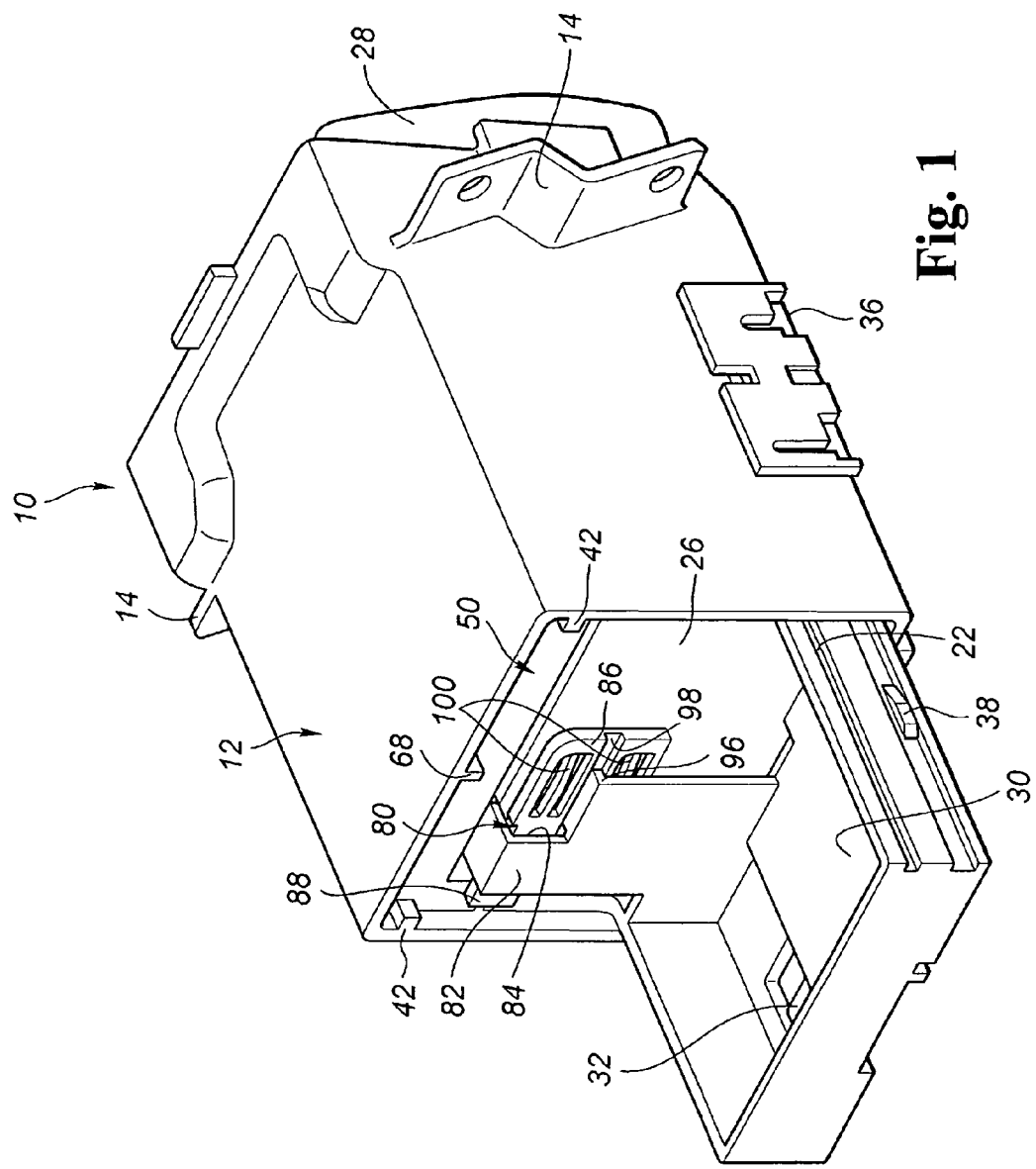
FIG. 1 is a perspective view showing one embodiment of a drawer device according to the present invention from the back.
Figure 2:
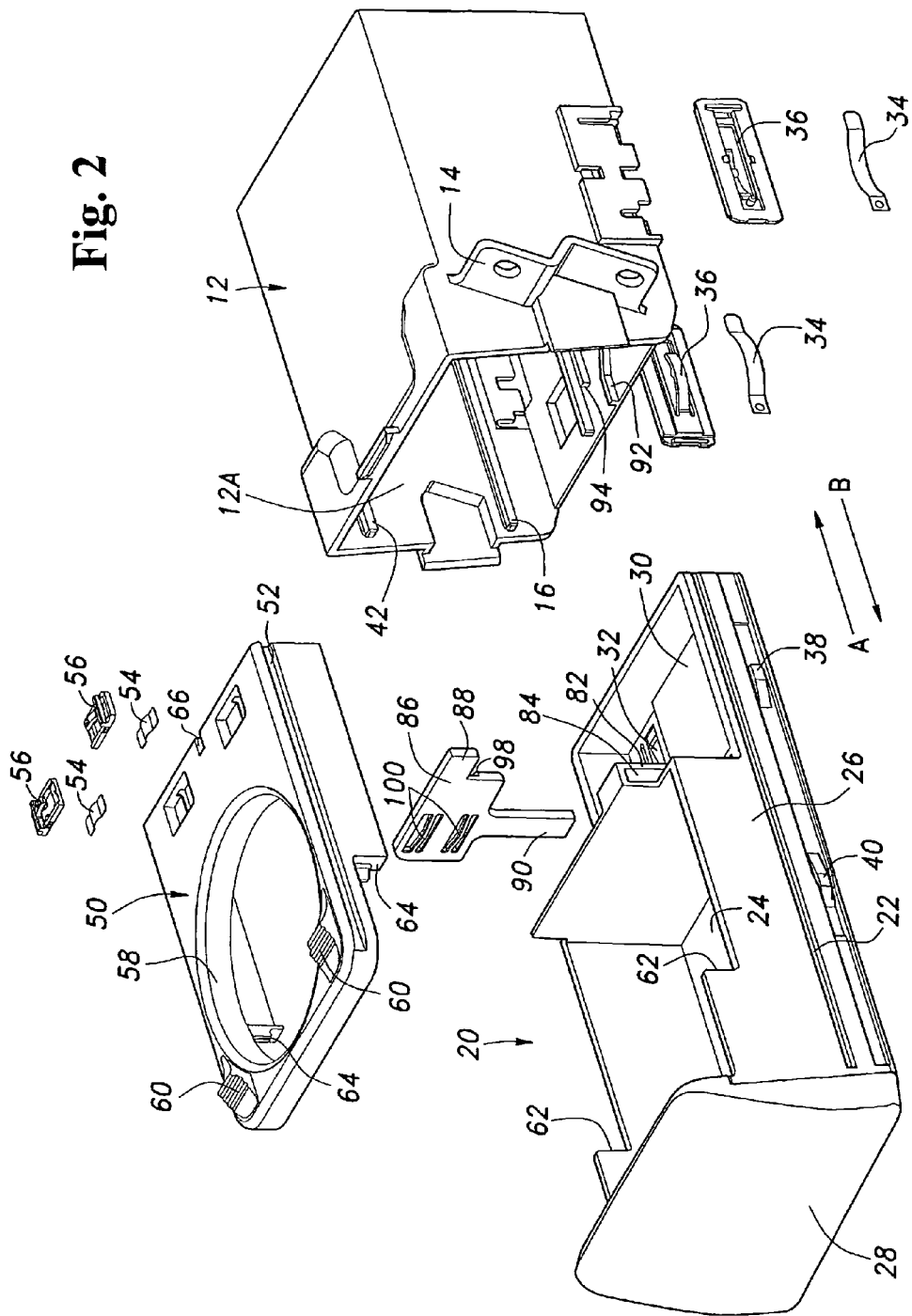
FIG. 2 is an exploded perspective view of the drawer device according to the present embodiment.

One embodiment of a drawer device according to the present invention will be explained with reference to FIGS. 1 to 7(c).

A drawer device 10 includes a housing 12 forming a device main body with a square box shape whose front face and back face have an opening and made of a resin molded article. In a case wherein the drawer device 10 is for automobile use, and fitted and placed in an instrument panel and the like for an automobile, the housing 12 is fixed and placed in the instrument panel and the like with attachment pieces 14 integrally formed on external surfaces of side walls on both right and left sides of the housing 12.

On the underside of inner surfaces of the side walls on both the right and left sides of the housing 12, guide projecting pieces 16 linearly extending in a back and forth direction are integrally formed. In a lower portion inside the housing 12, a tray 20 is provided so as to be capable of moving in the back and forth direction by slidably engaging the guide projecting pieces 16 with side-portion guide grooves 22 formed on external surfaces on both right and left sides of the tray 20. Due to the sliding engagement, the tray 20 can be taken in and out relative to the housing 12 in a sliding fashion.

The tray 20 is constituted by a tray main body 26 with a square box shape whose upside has an opening which defines a small-article storing portion 24 and is made of the resin molded article; and a decorative front plate member 28 attached to a front portion of the tray main body 26, and blocking a front-face opening 12A of the housing 12 in a housed position wherein the tray main body 26 is inserted into the housing 12.

In a back portion (rear portion) of the tray main body 26, a back-portion expanded portion 30 is integrally formed. On a bottom portion of the back-portion expanded portion 30, stopper pieces 32 are integrally formed. On the bottom portion of the housing 12, concave grooves 18 in which the stopper pieces 32 slidably engage are formed as grooves extending in the back and forth direction. End portions 32A abut against front-end wall portions 18A of the concave grooves 18, so that the stopper pieces 32 define a drawn position of the tray 20 relative to the housing 12. The defined position is the maximum drawn position of the tray 20.

Incidentally, although it is not shown in the drawings, the housed position (maximum pushed-in position) of the tray 20 relative to the housing 12 is defined by a stopper with a doorstop type formed in the bottom portion of the tray main body 26 and the bottom portion of the housing 12.

On both right and left side portions of the housing 12, click stop tools 36 urged by plate springs 34 are attached. On the external surfaces of both right and left side walls of the tray 20, there are formed engaging convex portions 38 engaging the click stop tools 36 by positioning the tray 20 in the maximum drawn position and carrying out a click stop operation, and engaging convex portions 40 engaging the click stop tools 36 by positioning the tray 20 in the housed position and carrying out the click stop operation.

On an upside of the inner surfaces of the side walls on both the right and left sides of the housing 12, guide projecting pieces 42 linearly extending in the back and forth direction are integrally formed. On an upper portion inside the housing 12, a cup holder plate 50 is provided so as to be capable of moving in the back and forth direction by slidably engaging the guide projecting pieces 42 with side-portion guide grooves 52 formed on external surfaces of both right and left sides of the cup holder plate 50. Due to the sliding engagement, the cup holder plate 50 is disposed in an upside position of the tray 20, and can be taken in and out relative to the housing 12 in the sliding fashion separately from the tray 20.

On an upper face of a back end of the cup holder plate 50, resistance imparting members 56 urged upward by plate springs 54 are attached. The resistance imparting members 56 are pressed against a ceiling surface of the housing 12, and provide a moderate resistance relative to a taken-in-and-out movement of the cup holder plate 50 in the sliding fashion so as to prevent the cup holder plate 50 from moving relative to the housing 12 due to a vibration and the like.

The cup holder plate 50 is constituted by the resin molded article, and in the cup holder plate 50, a circular cup-holding opening 58 for holding a cup for beverages, a beverage can, a plastic bottle, and the like without tipping over them is formed. On the upper face of a front end of the cup holder plate 50, finger-operating portions 60 for pushing the cup holder plate 50 into the housing 12 with one's fingertips are projected and formed.

On an upper margin of both right and left side walls of the tray main body 26, backward-looking step portions (first abutting portions) 62 are formed. The step portions 62 abut against forward-looking step portions 64 formed on a lower bottom face side of the cup holder plate 50 in a movement of a direction (direction shown with an arrow A in FIG. 2) housing the tray 20 inside the housing 12, and carry out an operation pushing the cup holder plate 50 in a direction housed inside the housing 12.

The step portions 64 abut against the step portions 62 of the tray main body 26 which is in the maximum drawn position, so that the maximum drawn position of the cup holder plate 50 is defined. The housed position (maximum pushed-in position) of the cup holder plate 50 relative to the housing 12 is defined by the stopper with the doorstop type which is made by a stopper concave portion 66 integrally formed in a back end portion of the cup holder plate 50 and a stopper convex portion 68 integrally formed in a ceiling portion of the housing 12.

In the tray main body 26, an abutting portion (second abutting portion) 72 is formed. In a movement wherein the tray 20 is drawn from the housing 12, when the tray 20 moves to the maximum drawn position from a position near the maximum drawn position, the abutting portion 72 abuts against an abutting piece 70 projected from a lower bottom portion of the cup holder plate 50, and moves the cup holder plate 50 in a direction (direction shown with an arrow B in FIG. 2) drawing the cup holder plate 50 from the housing 12. Incidentally, in the present embodiment, the abutting portion 72 is constituted by one portion of a back portion wall of the tray main body 26.

Figure 3:
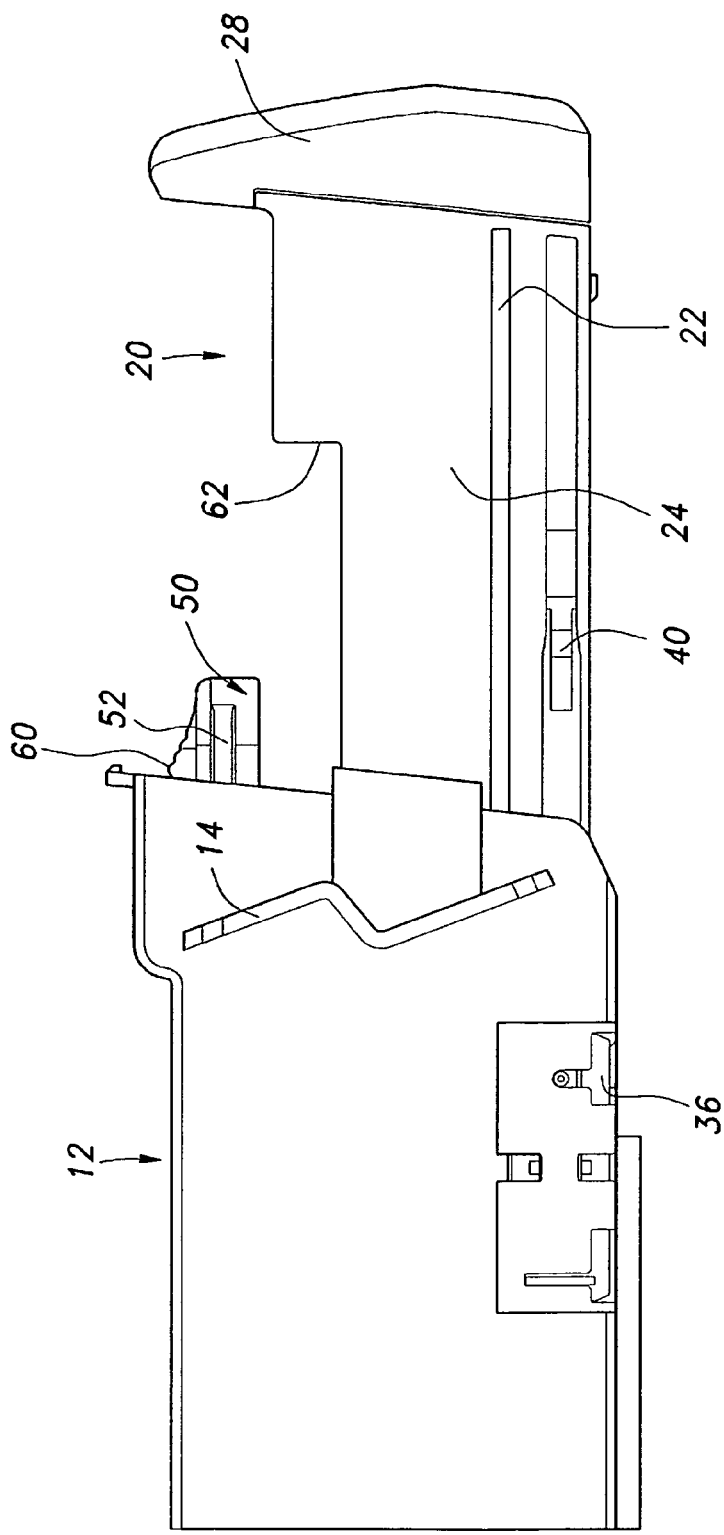
FIG. 3 is a side view of a usage state as a container box of the drawer device according to the present embodiment.

The cup holder plate 50 drawn from the housing 12 due to the above-mentioned abutting is shown in FIG. 3. In the drawn position, the cup-holding opening 58 of the cup holder plate 50 is exposed in front of the housing 12, and one's fingertips can be inserted in the cup-holding opening 58 so as to be capable of drawing the cup holder plate 50 from the housing 12 by a fingertip operation.

In a back face portion of the tray main body 26, a connecting mechanism 80, connecting the tray 20 and the cup holder plate 50 so as to be capable of separating, is constituted.

The connecting mechanism 80 includes a plate-like engaging member 86 provided so as to be capable of sliding and moving in a right and left direction in a void 84 of a slit defined by a double wall portion 82 integrally formed in a back face of the tray main body 26. The engaging member 86 is the resin molded article, and integrally formed by an engaging piece portion 88 projecting laterally and a cam follower piece portion 90 extending downward.

From viewing a surface of projection of the back and forth direction of the housing 12, the engaging member 86 can slide between an engaging movement position, as shown in FIGS. 4(*a*) and 5(*a*), wherein the engaging piece portion 88 is overlapped with a connecting piece portion 91 formed in the back end portion of the cup holder plate 50, and an evacuated position, as shown in FIGS. 4(*b*) and 5(*b*), wherein the engaging piece portion 88 is not overlapped with the connecting piece portion 91.

A sliding movement of the engaging member 86 is carried out by being guided by a slidable engagement between a guiding projecting piece 96 formed in the double wall portion 82 of the tray main body 26 and a guiding concave groove 98 formed in the engaging member 86. In the engaging member 86, bridge-like spring piece portions 100 are integrally formed, and pressed against the back face of the tray main body 26, so that the engaging member 86 cannot wobble in a board-thickness direction.

In a state of the evacuated position, the engaging piece portion 88 and the connecting piece portion 91 are not overlapped, so that the engaging member 86 allows a free movement of the taken-in-and-out direction of the cup holder plate 50 relative to the tray 20. On the other hand, in a state of the engaging movement position, due to a relative position of the taken-in-and-out direction between the tray 20 and the cup holder plate 50, the engaging member 86 selectively takes any of a state, as shown in FIG. 4(*a*), wherein the engaging piece portion 88 is overlapped with the connecting piece portion 91 at a rear side of the connecting piece portion 91, and a state, as shown in FIG. 5(*a*), wherein the engaging piece portion 88 is overlapped with the connecting piece portion 91 at a front side of the connecting piece portion 91.

In the state wherein the engaging piece portion 88 is overlapped with the connecting piece portion 91 at the rear side of the connecting piece portion 91, the tray 20 moves in a direction B which is drawn from the housing 12, so that the engaging piece portion 88 abuts against a rear face (back face) of the connecting piece portion 91, and connects the cup holder plate 50 and the tray 20 in a movement of the direction B which is drawn from the housing 12. On the other hand, in the state wherein the engaging piece portion 88 is overlapped with the connecting piece portion 91 at the front side of the connecting piece portion 91, even if the tray 20 moves in the direction drawn from the housing 12, the engaging piece portion 88 abuts against a front face of the connecting piece portion 91, and does not connect the cup holder plate 50 and the tray 20 in the movement of the direction B which is drawn from the housing 12, and connects the cup holder plate 50 and the tray 20 in a movement of a direction A which houses in the housing 12.

As shown in FIGS. 6(*a*) to 7(*c*), on an inner surface of a bottom wall of the housing 12, there are formed cam-shaped portions 92, 94 with a reinforcing rib shape wherein the cam follower piece portion 90 of the engaging member 86 engages by a cam. The cam-shaped portions 92, 94 include back-side linear portions 92A, 94A extending in the same direction as the taken-in-and-out direction of the tray 20; right-and-left inclined portions 92B, 94B formed on a front-face opening 12A side of the housing 12 and continuing to front ends of the back-side linear portions 92A, 94A; and front-side linear portions 92C, 94C continuing to front ends of the right-and-left inclined portions 92B, 94B.

The cam-shaped portion 92 is a cam operating at a drawing movement time of the tray 20. As shown in FIG. 6(*a*), in a state wherein the tray 20 is in the housed position or a position just before the maximum drawn position, and the cam follower piece portion 90 is engaged with the back-side linear portion 92A, the cam-shaped portion 92 positions the engaging member 86 in the engaging movement position. Also, as shown in FIGS. 6(*b*) and 6(*c*), the tray 20 is drawn to the maximum drawn position from the position just before the maximum drawn position, so that the cam follower piece portion 90 passes through the right-and-left inclined portion 92B, and engages the front-side linear portion 92C so as to position the engaging member 86 in the evacuated position. A movement to the evacuated position of the engaging member 86 may be carried out in a process wherein the tray 20 is drawn to the maximum drawn position from the position just before the maximum drawn position.

As shown in FIG. 6(*c*), if the tray 20 is in the maximum drawn position (including the position near the maximum drawn position), and the cup holder plate 50 is also in the maximum drawn position (including the position near the maximum drawn position), i.e., if both the cup holder plate 50 and the tray 20 are in a state drawn near the maximum drawn position, the connecting piece portion 91 of the cup holder plate 50 is positioned in a front side of the engaging piece portion 88 of the engaging member 86 which is in the evacuated position.

Figure 7A:
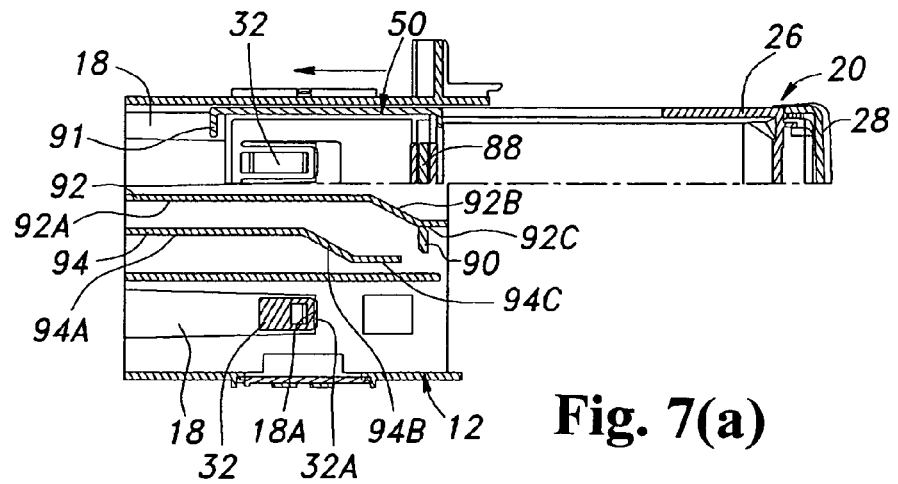
FIGS. 7(a) to 7(c) are cross-sectional views corresponding to a surface of section of line VII-VII in FIG. 5 showing the usage state as the container box of the drawer device according to the present embodiment.
Figure 7B:
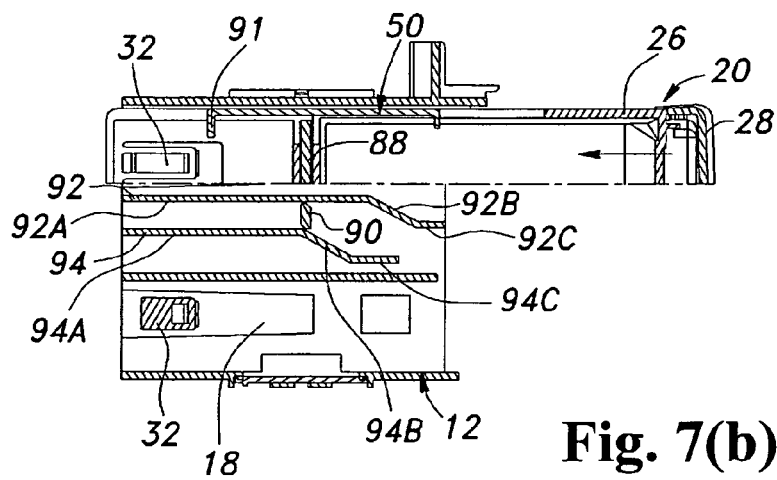
Figure 7C:
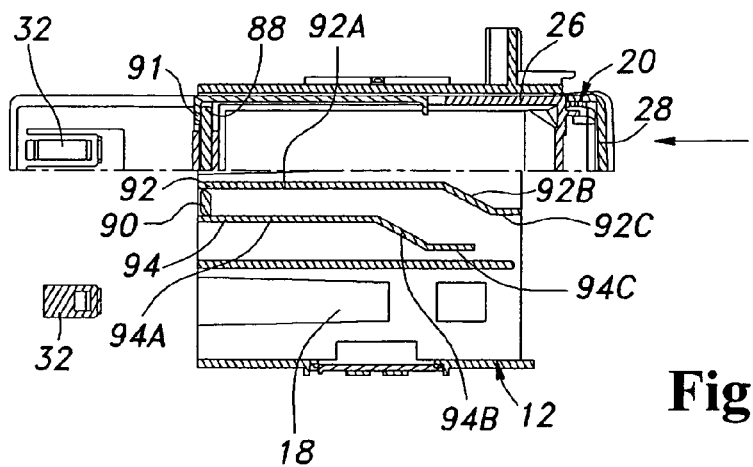

The other cam-shaped portion 94 is a cam operating at a housing movement time of the tray 20. As shown in FIG. 7(a), in a state wherein the tray 20 is in the maximum drawn position or slightly on a housed position side of the maximum drawn position, and the cam follower piece portion 90 is engaged with the front-side linear portion 92C, the cam-shaped portion 94 positions the engaging member 86 in the evacuated position. Also, as shown in FIGS. 7(b) and 7(c), the tray 20 is pushed into the housed position side from the slightly housed position of the maximum drawn position, so that the cam follower piece portion 90 passes through the right-and-left inclined portion 94B, and engages the back-side linear portion 94A so as to position the engaging member 86 in the engaging movement position.

Due to the above-mentioned operation, the engaging member 86 is positioned in the evacuated position allowing the free movement of the taken-in-and-out direction of the cup holder plate 50 relative to the tray 20 by positioning the tray 20 in the maximum drawn position (including the position near the maximum drawn position), and moves in the engaging movement position by positioning the tray 20 in a position other than the maximum drawn position (including the position near the maximum drawn position). In a case wherein both the cup holder plate 50 and the tray 20 are housed inside the housing 12 from the state wherein both the cup holder plate 50 and the tray 20 are drawn to the maximum drawn position (including the position near the maximum drawn position), in the engaging movement position, the engaging piece portion 88 is positioned on the rear side of the connecting piece portion 91 of the tray 20, and in a movement of a direction drawn from the housing 12, the engaging member 86 connects the cup holder plate 50 and the tray 20. On the other hand, in a case wherein the tray 20 is housed inside the housing 12 in the state wherein the cup holder plate 50 is not positioned in the maximum drawn position (including the position near the maximum drawn position), in the engaging movement position, the engaging piece portion 88 is positioned on the front side of the connecting piece portion 91 of the tray 20, and the engaging member 86 separates the cup holder plate 50 and the tray 20 and does not connect them in the movement of the direction drawn from the housing 12.

Next, with reference to FIGS. 6(a) to 7(c) together with FIGS. 1 to 5(b), handling of the drawer device 10 according to the present embodiment will be explained.

Figure 4A:
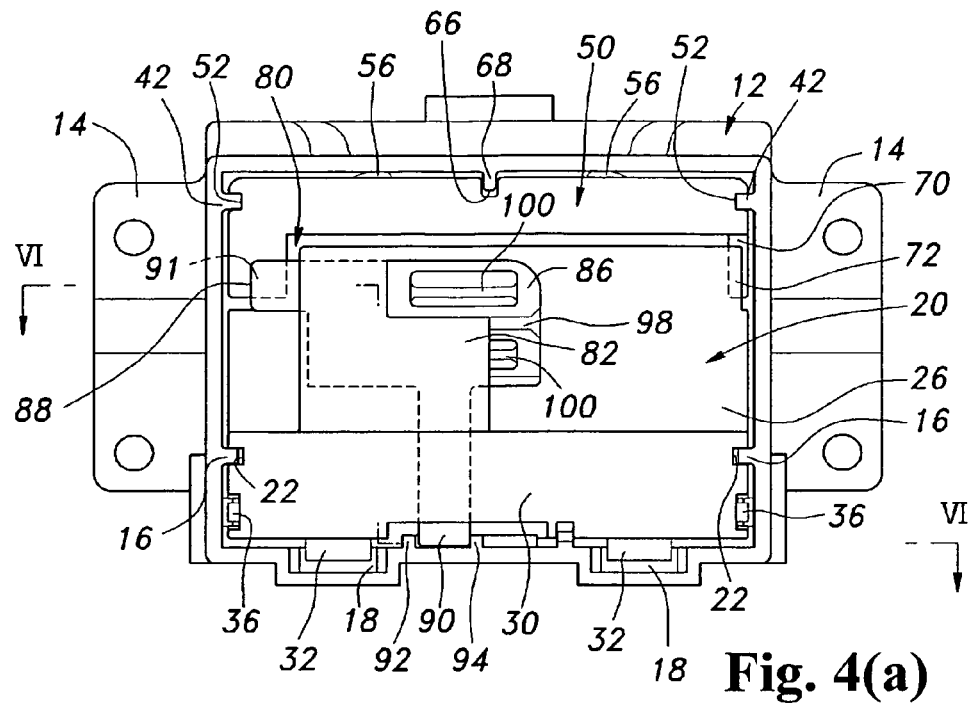
FIGS. 4(a) and 4(b) are rear views of a usage state as a cup holder of the drawer device according to the present embodiment.
Figure 6A:
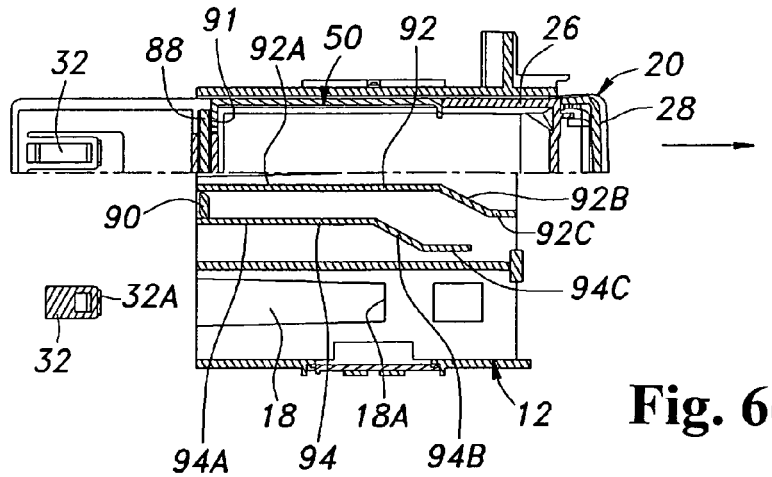
FIGS. 6(a) to 6(c) are cross-sectional views corresponding to a surface of section of line VI-VI in FIG. 4 showing the usage state as the cup holder of the drawer device according to the present embodiment.

FIGS. 4(a) and 6(a) show a housed positional state in a case when the drawer device 10 is used as a cup holder wherein both the cup holder plate 50 and the tray 20 are drawn to the maximum drawn position (including the position near the maximum drawn position) in a previous usage. The engaging piece portion 88 of the engaging member 86 which is in the engaging movement position is positioned on the back side of the connecting piece portion 91 of the tray 20. Specifically, as shown in FIG. 4(a), in looking at the surface of projection of the back and forth direction of the housing 12, the engaging piece portion 88 is in a state overlapping with the connecting piece portion 91 at the back side of the connecting piece portion 91.

From this state, when the tray 20 is drawn, the engaging piece portion 88 abuts against the rear face of the connecting piece portion 91, and in the movement of the direction drawn from the housing 12, the cup holder plate 50 and the tray 20 are connected. Also, due to a drawing movement of the tray 20, the engaging piece portion 88 moves in a drawing direction accompanied by the drawing movement of the tray 20 in such a way as to be pushed by the engaging member 86 on a tray 20 side.

Figure 6B:
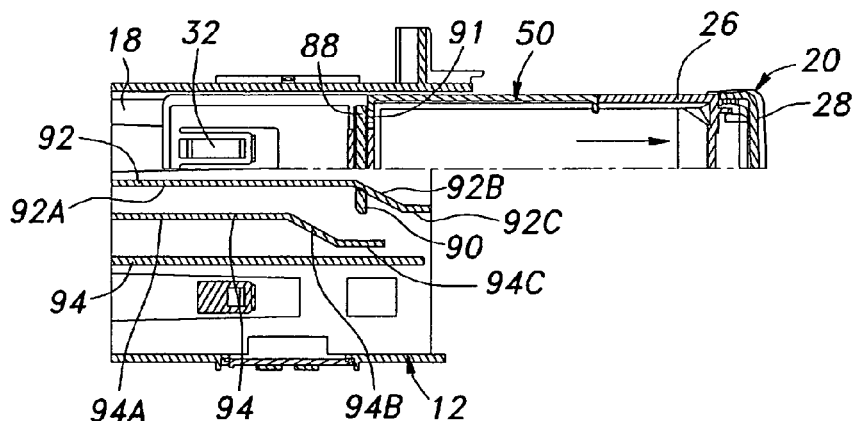

As shown in FIG. 6(b), due to the drawing movement of the tray 20, the cam follower piece portion 90 of the engaging member 86 reaches the right-and-left inclined portion 92B of the cam-shaped portion 92, and the engaging member 86 starts to move to the evacuated position from the engaging movement position. However, a movement wherein the cup holder plate 50 is drawn accompanied by the drawing movement of the tray 20 is carried out to the edge of a position wherein the tray 20 is positioned in the maximum drawn position (including the position near the maximum drawn position). Thereby, only by drawing the tray 20, a usage state as the cup holder wherein both the cup holder plate 50 and the tray 20 are drawn to the maximum drawn position can be replicated.

Figure 4B:
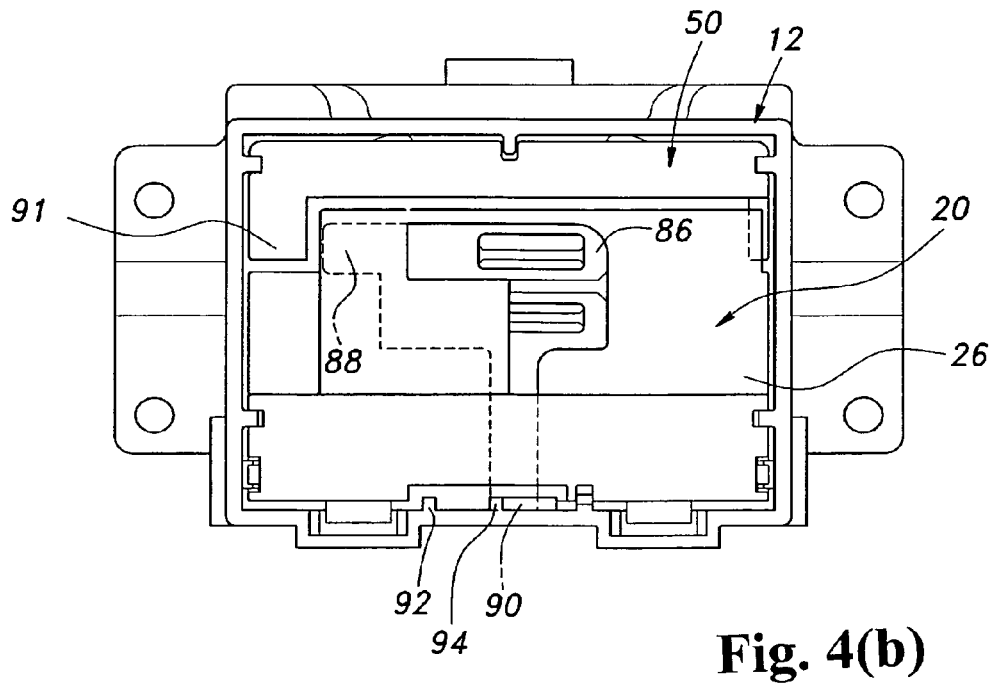
Figure 5A:
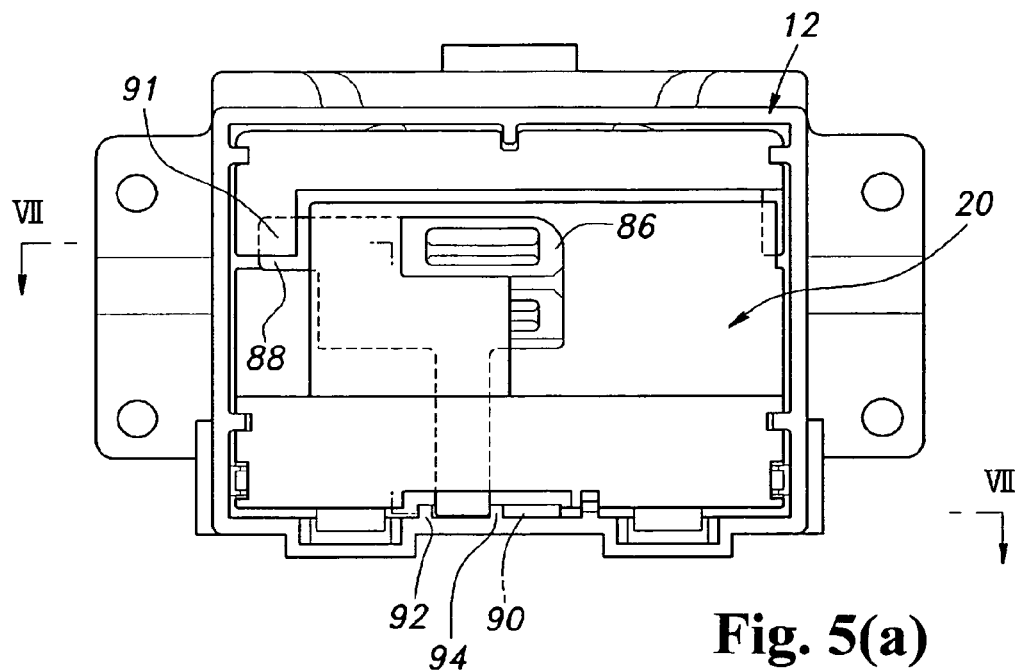
FIGS. 5(a) and 5(b) are rear views of the usage state as the container box of the drawer device according to the present embodiment.
Figure 5B:
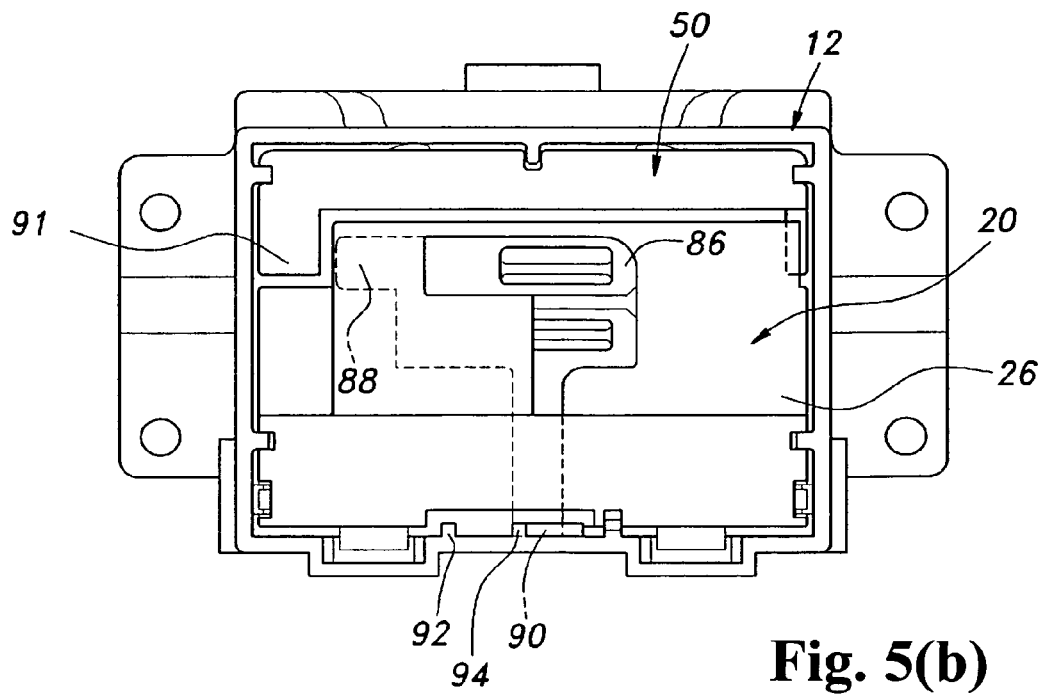
Figure 6C:
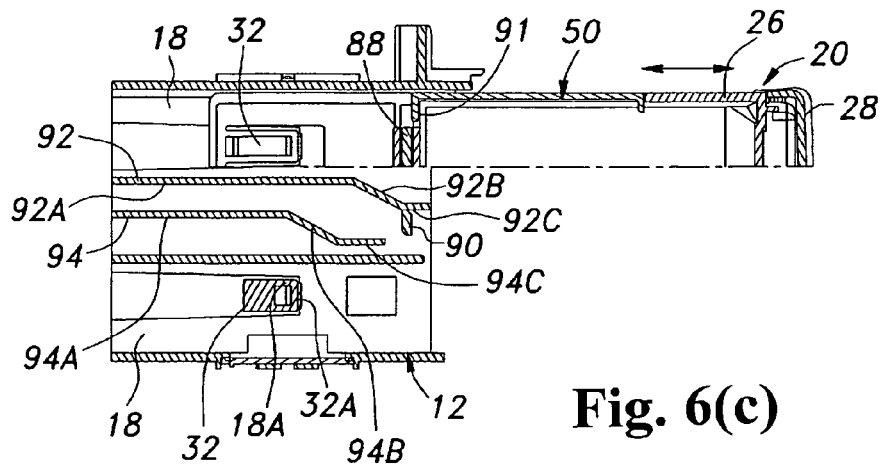

As shown in FIGS. 4(b), 5(b), 6(c), when the tray 20 is positioned in the maximum drawn position (including the position near the maximum drawn position), the engaging member 86 is positioned in the evacuated position, and comes to a state allowing the free movement in the taken-in-and-out direction of the cup holder plate 50 relative to the tray 20.

When an operation returning the tray 20 to the housed position is carried out while the cup holder plate 50 remains in a state drawn to the maximum drawn position (including the position near the maximum drawn position), the cup holder plate 50 is returned to the housed position shown in FIG. 6(a) together with the tray 20 in such a way as to be pushed by the tray 20 by abutment of the step portions 62 of the tray 20 and the step portions 64 of the cup holder plate 50.

Thus, in a housing operation from the usage state as the cup holder, the engaging piece portion 88 of the engaging member 86 which is in the engaging movement position is positioned on the back side of the connecting piece portion 91 of the tray 20.

As shown in FIG. 6(c), in the state wherein both the tray 20 and the cup holder plate 50 are positioned in the maximum drawn position, when only the cup holder plate 50 is pushed into a housing direction, as shown in FIG. 7(a), only the cup holder plate 50 is housed, and the drawer device 10 comes to a usage state as a container box wherein small articles are stored in the small-article storing portion 24 of the tray 20.

From this state, when the tray 20 is returned to the housed position, as shown in FIG. 7(b), the engaging member 86 returns to the engaging movement position in a returning process thereof. However, the engaging piece portion 88 of the engaging member 86 is positioned on the front side of the connecting piece portion 91 of the tray 20. Thereby, in a housing returning state of this case, as shown in FIGS. 5(a) and 7(c), the engaging piece portion 88 of the engaging member 86 which is in the engaging movement position is positioned on the front side of the connecting piece portion 91 of the tray 20.

Thereby, in a housing operation from the usage state as the container box, the engaging piece portion 88 of the engaging member 86 which is in the engaging movement position is positioned on the front side of the connecting piece portion 91 of the tray 20. Also, in a case wherein the tray 20 is drawn from the housed state, the cup holder plate 50 does not move, and only the tray 20 is drawn, so that the usage state as the container box is replicated.

Thus, the drawer device 10 of the present embodiment can be used selectively as the container box or the cup holder without requiring a troublesome operation, and improves usability.

EXPLANATION OF SYMBOLS 10 a drawer device
12 a housing 20 a tray
50 a cup holder plate
62 step portions (first abutting portions)
72 an abutting portion (second abutting portion)
80 a connecting mechanism
86 an engaging member
88 an engaging piece portion
90 a cam follower piece portion
91 a connecting piece portion
92, 94 cam-shaped portions

What is claimed is:

1. A drawer device, comprising:
a box-shaped housing with a front face opening;
a tray with an upside opening, provided in the housing so as to be capable of being inserted in and withdrawn out from the housing and having a first abutting portion;
a cup holder plate disposed on an upside of the tray, and provided in the housing so as to be capable of being inserted in and withdrawn separately from the tray, the first abutting portion abutting against the cup holder plate to move the cup holder plate along with the tray towards an inside of the housing; and
a connecting mechanism connecting or disconnecting the cup holder plate and the tray, the connecting mechanism having an engaging member provided in the tray and moving between a disengaged position in which the tray is in a maximum drawn position wherein the cup holder can freely move relative to the tray in an inserting direction and a withdrawing direction, and an engaging movement position in which the tray is positioned in a position other than the maximum drawn position wherein the connecting mechanism connects the cup holder plate and the tray;
wherein the engaging member comprises a cam-shaped portion formed in the housing, and a cam follower portion engaging the cam-shaped portion,
under the cam-engagement, the engaging member moves between the disengaged position and the engaging movement position due to the tray moving in the inserting or withdrawing direction relative to the housing,
when the cup holder plate and the tray are housed inside the housing after the cup holder plate and the tray are drawn to the maximum drawn position, the engaging member is in the engaging movement position and connects the cup holder plate and the tray,
when the tray is housed inside the housing after only the tray is drawn to the maximum drawn position, the cup holder plate and the tray are disconnected, and
when the tray is housed inside the housing in a condition that the cup holder plate is not drawn to the maximum drawn position, the engaging member is in the engaging movement position, and does not connect the cup holder plate and the tray in the withdrawing direction.

2. A drawer device according to claim 1, wherein the tray comprises a second abutting portion abutting against the cup holder plate when the tray moves from a position near the maximum drawn position to the maximum drawn position, and moving the cup holder plate in the withdrawing direction.

3. A drawer device, comprising:
a box-shaped housing with a front face opening;
a tray with an upside opening, provided in the housing so as to be capable of being inserted in and withdrawn out from the housing;
a cup holder plate disposed on an upside of the tray, and provided in the housing so as to be capable of being inserted in and withdrawn separately from the tray; and
a connecting mechanism connecting or disconnecting the cup holder plate and the tray, the connecting mechanism having an engaging member provided in the tray and moving between a disengaged position in which the tray is in a maximum drawn position wherein the cup holder can freely move relative to the tray in an inserting direction and a withdrawing direction, and an engaging movement position in which the tray is positioned in a position other than the maximum drawn position wherein the connecting mechanism connects the cup holder plate and the tray;
wherein the connecting mechanism further includes a cam-shaped portion formed in the housing,
the engaging member includes an engaging piece portion and a cam follower piece portion extending downwardly from the engaging piece portion and engaging the cam-shaped portion so that the engaging piece portion slides in a left and right direction to engage and disengage the cup holder plate,
when the cup holder plate and the tray are housed inside the housing after the cup holder plate and the tray are drawn to the maximum drawn position, the engaging member is in the engaging movement position and connects the cup holder plate and the tray,
when the tray is housed inside the housing after only the tray is drawn to the maximum drawn position, the cup holder plate and the tray are disconnected, and
when the tray is housed inside the housing in a condition that the cup holder plate is not drawn to the maximum drawn position, the engaging member is in the engaging movement position, and does not connect the cup holder plate and the tray in the withdrawing direction.

4. A drawer device according to claim 1, wherein the cup holder plate comprises a connecting piece portion in a back end portion,
the engaging member comprises an engaging piece portion to abut the connecting piece portion,
when the engaging member is in the engaging movement position, the engaging piece portion overlaps the connecting piece portion, and
when the tray or the cup holder plate is in the maximum drawn position, the engaging piece portion does not overlap the connecting piece portion.

5. A drawer device according to claim 4, wherein the connecting mechanism is arranged so that when the engaging member overlaps the connecting piece portion at a rear side of the connecting piece portion, the engaging piece portion abuts against a rear face of the connecting piece portion, and connects the cup holder plate and the tray moving in the withdrawing direction, and
when the engaging piece portion overlaps the connecting piece portion at a front side of the connecting piece portion, the engaging piece portion abuts against a front face of the connecting piece portion, and does not connect the cup holder plate and the tray moving in the withdrawing direction.

* * * * *